US009353759B2

(12) United States Patent
Horner et al.

(10) Patent No.: US 9,353,759 B2
(45) Date of Patent: May 31, 2016

(54) TURBOCHARGER BYPASS SYSTEM

(75) Inventors: Joshua Horner, Oak Park, IL (US);
Paul Gottemoller, Palos Park, IL (US)

(73) Assignee: Inernational Engine Intellectual Property Company, LLC., Lisle, IL (US)

( * ) Notice: Subject to any disclaimer, the term of this patent is extended or adjusted under 35 U.S.C. 154(b) by 749 days.

(21) Appl. No.: 13/702,063

(22) PCT Filed: Jun. 4, 2010

(86) PCT No.: PCT/US2010/037362
§ 371 (c)(1),
(2), (4) Date: Dec. 4, 2012

(87) PCT Pub. No.: WO2011/152828
PCT Pub. Date: Dec. 8, 2011

(65) Prior Publication Data
US 2013/0170948 A1 Jul. 4, 2013

(51) Int. Cl.
| F04D 29/06 | (2006.01) |
| F04D 29/00 | (2006.01) |
| F02B 37/16 | (2006.01) |
| F02B 33/44 | (2006.01) |
| F04D 15/00 | (2006.01) |
| F04D 27/00 | (2006.01) |
| F02B 37/013 | (2006.01) |
| F02B 37/18 | (2006.01) |

(52) U.S. Cl.
CPC ............... *F04D 29/00* (2013.01); *F02B 33/44* (2013.01); *F02B 33/446* (2013.01); *F02B 37/013* (2013.01); *F02B 37/16* (2013.01); *F02B 37/18* (2013.01); *F04D 15/0011* (2013.01); *F04D 27/009* (2013.01); *F05D 2260/606* (2013.01); *Y02T 10/144* (2013.01)

(58) Field of Classification Search
CPC ... F01D 17/08; F04D 15/0011; F04D 27/009; F05D 2260/606; F02B 28/16; F02B 33/44; F02B 33/446
See application file for complete search history.

(56) References Cited

U.S. PATENT DOCUMENTS

| 3,868,822 | A | * | 3/1975 | Keller | F02B 33/44 60/611 |
| 4,870,822 | A | * | 10/1989 | Kamimaru | F02B 37/186 123/564 |
| 7,654,086 | B2 | * | 2/2010 | Gong | F02B 33/34 60/611 |
| 8,302,402 | B2 | * | 11/2012 | Boley | F02B 37/16 60/611 |
| 8,307,649 | B2 | * | 11/2012 | Axelsson | F01N 13/1827 123/562 |

* cited by examiner

*Primary Examiner* — Ninh H Nguyen
(74) *Attorney, Agent, or Firm* — Jack D. Nimz; Jeffrey P. Calfa

(57) ABSTRACT

A turbocharger bypass system and method for minimizing the occurrence of oil seepage from the bearing housing into the compressor housing as a result of a pressure differential across the bearing housing and the compressor housing. A bypass system with a pressure dependent check valve is connected to the inlet air passage of a turbocharged engine. When the pressure in the inlet air passage drops to below atmosphere or a predetermined level of depression, the check valve opens to allow a flow of atmospheric air into the inlet air passage, thus minimizing or eliminating the pressure differential generated as a result of a vacuum in the inlet air passage during motoring conditions, or when an exhaust valve downstream of the turbocharger is closed, such as during engine braking. The bypass system is applicable to both single stage and dual stage turbocharged internal combustion engines.

13 Claims, 3 Drawing Sheets

TURBOCHARGER BYPASS SYSTEM

FIELD OF THE INVENTION

This invention relates to internal combustion engines and more particularly to a turbocharged engine.

BACKGROUND OF THE INVENTION

Multi-cylinder internal combustion engines, particularly diesel engines for large tractor-trailer trucks, may include an exhaust-gas turbocharger. The turbocharger includes a turbine that drives a compressor via a shaft, which generates an increased intake air pressure in the intake duct during normal operation.

The turbine shaft is typically supported on two bearings within a central housing between the turbine and the compressor. Lubricating oil is supplied through a port in the central housing wall and split through oil channels to feed both bearings. Turbochargers commonly use crankcase oil to lubricate the rotating bearing interfaces as well as the thrust surfaces that limit axial excursions of the shaft and its turbine and compressor wheels.

Some examples of turbochargers and bearing lubrication systems can be found in U.S. Pat. Nos. 6,709,160; 4,902,144; 6,418,722 and 5,076,766, herein incorporated by reference.

In turbocharger systems, oil may leak across the turbo bearings into the compressor housing. The bearings support a rotatable shaft on which a turbine and compressor wheels are fixedly mounted. A turbocharger installed in an internal combustion engine is usually provided with a shaft seal arrangement for preventing lubricating oil supplied to the bearings from leaking into a compressor housing of the turbocharger. Oil may still leak into the compressor housing if the pressure in the compressor housing is lower than the pressure in the central housing.

Under motoring conditions, a vacuum force is generated on the outlet side of the compressor as a result of the continuous operation of the pistons and a decrease in the amount of exhaust gas available to operate the turbine-driven compressor. The pressure differential generated across the seals in the central housing causes oil in the housing to seep toward the compressor.

In some turbocharged internal combustion engines, an exhaust valve is disposed downstream of the turbine. Under certain operating conditions, such as to increase engine operating temperatures, or for engine braking, the exhaust valve is closed. When the exhaust valve is closed, a buildup of pressure occurs in the engine, which restricts rotation of the turbine. Under normal operating conditions, the turbine turns as a result of exhaust gas expanding as it moves across the turbine. When the valve is closed, a build up of pressure restricts expansion of the exhaust gas. As a result, the compressor is unable to compress sufficient air to the inlet air passage to maintain positive pressure in the inlet air passage. Under these circumstances, oil is prone to seeping into the compressor housing as a result of a pressure difference across the oil seal.

Normally, a positive air pressure inside the compressor prevents oil leakage into the compressor housing. However, under vacuum conditions generated under motoring conditions, or under operating conditions where the exhaust gas valve is closed, oil tends to seep into the compressor housing.

Various prior art patents, including U.S. Pat. Nos. 3,574,478 and 5,076,765, have attempted to address the issue of oil seepage under vacuum conditions.

The present inventors have recognized the need for a simple, efficient way of preventing oil from seeping into the compressor housing during motoring conditions, or when the exhaust valve is closed downstream of the turbocharger outlet.

The present inventors have recognized the need for a system which allows a turbocharged engine to act as a naturally aspirated engine at conditions when the engine is in a motoring condition.

The present inventors have recognized the need for a system which assists in maintaining the shaft seal arrangement while also increasing the air flow through the engine.

SUMMARY OF THE INVENTION

According to an exemplary embodiment of the present invention, a bypass system is located between the air inlet of a compressor and downstream of the compressor, at the inlet air passage.

The bypass system, by allowing the air inlet passage downstream of the compressor to be directly connected to a source of air at atmospheric pressure, decreases the vacuum generated at the compressor housing, and minimizes the pressure differential across oil seals in the central shaft housing. As a result, oil seepage from the bearing housing into the compressor housing is minimized.

Under some operating conditions, by allowing atmospheric air to enter the engine intake directly without requiring it to flow through the compressor, air flow to the engine is increased as a result of avoiding the resistance of the compressor.

The bypass system comprises an air flow passageway from the air inlet of the compressor to the inlet air passage, which allows air flow to bypass the compressor. The passageway comprises a check valve which opens when there is a pressure differential across the valve generated as a result of lower pressure on the inlet air passage side of the valve, and allows air at atmospheric pressure to enter the valve. When air in the inlet air passage is above atmospheric pressure, the valve remains closed, allowing air to flow through the turbocharger compressors to reach the intake. In an alternative embodiment, the check valve opens when the pressure differential across the valve generated as a result of lower pressure on the inlet air passage side of the valve reaches a predetermined amount.

Numerous other advantages and features of the present invention will be become readily apparent from the following detailed description of the invention and the embodiments thereof, from the claims and from the accompanying drawings.

DETAILED DESCRIPTION OF THE INVENTION

Figure 1:
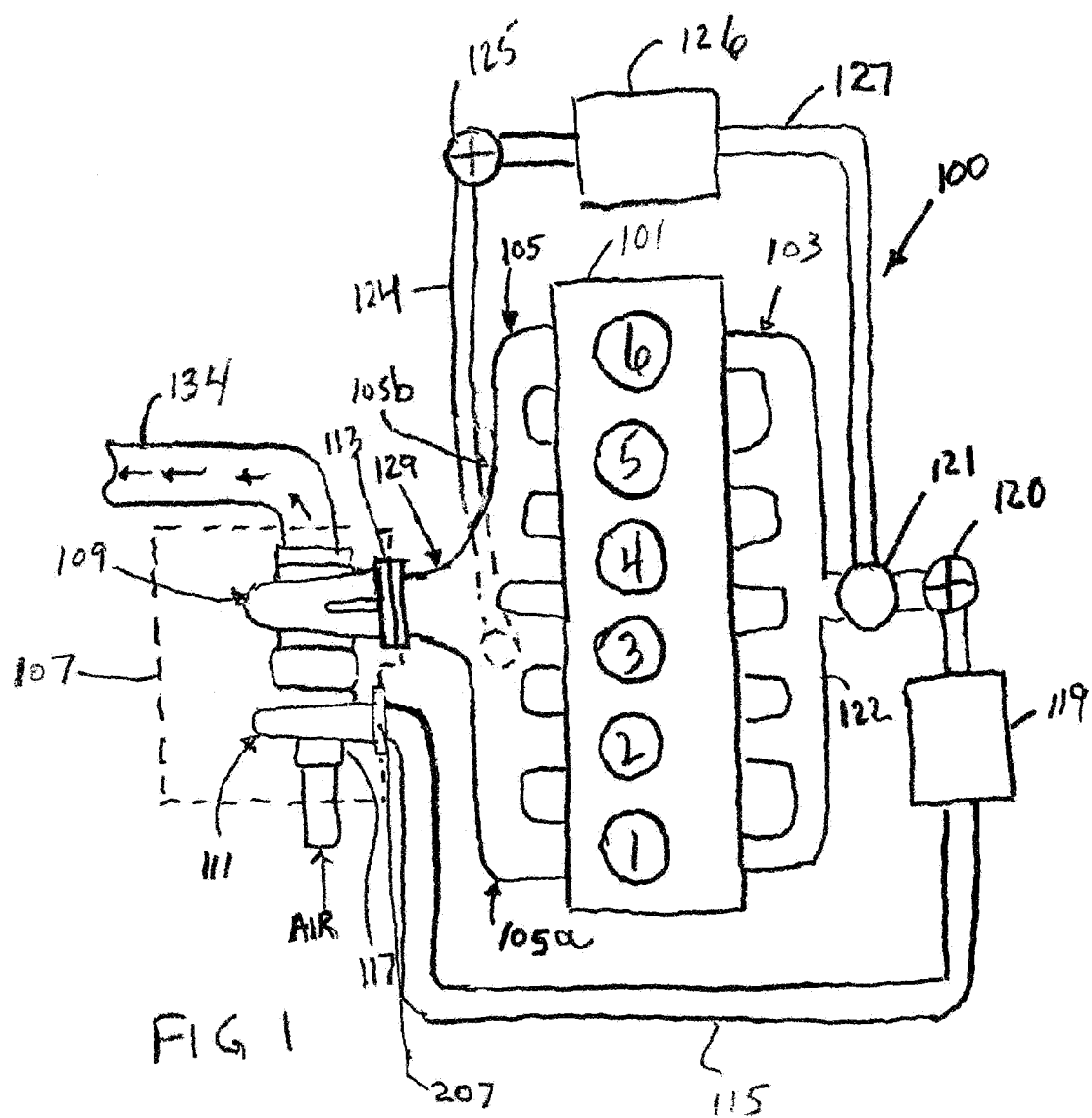
FIG. 1 is a schematic diagram of an engine system that includes a turbocharger

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An engine 100 is shown schematically in FIG. 1. The engine 100 has a block 101 that includes a plurality of cylinders. The cylinders in the block 101 are fluidly connected to an intake system 103 and to an exhaust system 105. The exhaust system includes a first pipe 105a from cylinders 1, 2 and 3 of one bank of cylinders and a second pipe 105b from cylinders 4, 5 and 6. Although an inline arrangement of six cylinders is illustrated, inline or V-arrangements or other arrangements of plural cylinders of any number of cylinders are also encompassed by the invention.

Figure 2:
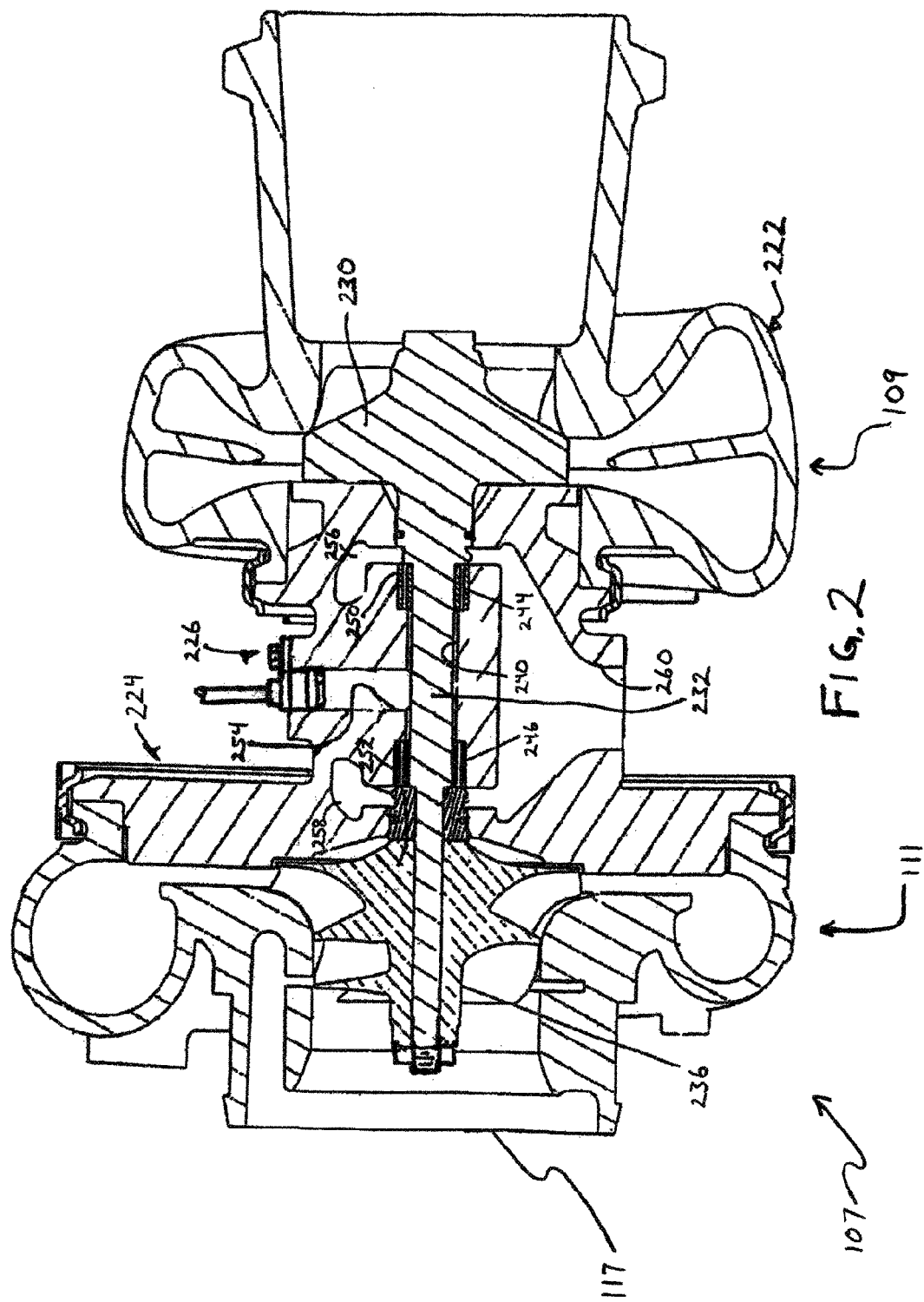
FIG. 2 is a front elevation view, taken in section, of a turbocharger.

As illustrated in FIGS. 1 and 2, a turbocharger 107 includes a turbine 109. The turbine 109 shown has a turbine inlet port 113 connected to the exhaust system 105. The turbocharger 107 includes a compressor 111 connected to the intake system 103 through an inlet air passage 115.

During operation of the engine 100, air may enter the compressor 111 through an air inlet 117. Compressed air may exit the compressor 111 through a discharge nozzle 207, pass through the inlet air passage 115, and pass through an optional charge air cooler 119 and an optional inlet throttle 120 before entering an intake air mixer 121 and an intake air manifold 122 of the intake system 103. The compressed air enters the engine cylinders 1-6.

A stream of exhaust gas from the exhaust system 105 may be routed through an EGR passage or conduit 124, through an exhaust gas recirculation (EGR) valve 125, through an exhaust gas recirculation (EGR) cooler 126 and pass through a further EGR conduit 127 before meeting and mixing with air from the inlet throttle 120 at the mixer 121.

The inlet port 113 of the turbine 109 may be connected to the exhaust pipes 105a, 105b in a manner that forms an exhaust manifold 129. Exhaust gas passing through the turbine 109 may exit the engine 100 through a tailpipe 134. Emissions and sound treating components can be arranged to receive the exhaust gas from the tailpipe, before exhausting to atmosphere, as is known.

At times when the EGR valve 125 is at least partially open, exhaust gas flows through pipes 105a, 105b, through the conduit 124, through the EGR valve 125, through the EGR cooler 126, through the further conduit 127 and into the mixer 121 where it mixes with air from the inlet throttle 120. An amount of exhaust gas being re-circulated through the EGR valve 125 may depend on a controlled opening percentage of the EGR valve 125.

As illustrated in FIG. 2, a turbocharger 107 includes a turbine housing 222, a compressor housing 224, and a bearing or center housing 226 disposed between the turbine housing 222 and compressor housing 224.

A turbine wheel 230 is fixed on a shaft 232 with the turbine wheel 230 surrounded by the turbine housing 222 and the shaft 232 extending through the bearing housing 226 and into the compressor housing 224. A compressor wheel 236 is mounted on the shaft 232 in the compressor housing 224. The bearing housing 226 has a central bore 240 that includes bearing lands 244, 246. To rotationally support the shaft 232 and the turbine and compressor wheels, a pair of bearings 250, 252 are received in the bearing lands 244, 246, respectively. In order to lubricate the bearing system described above, a lubricant, which is normally engine crankcase lubricating oil, is introduced under pressure through a lubricant inlet port 254 formed in the bearing housing 226. The inlet port 254 is a simple straight bore in the housing 226 that communicates with the central bore 240 in the bearing housing.

From the inlet port 254, lubricant migrates axially outwardly along the shaft 232 in both axial directions in the space between the shaft 232 and the central bore 240 toward the journal bearings 250, 252. When the lubricant reaches the journal bearings 250, 252, it is constrained to flow through a plurality of flow paths around the journal bearings and into a pair of oil collection spaces 256, 258 and from there into an oil collection sump 260 where it is returned to the engine crankcase in a conventional manner.

Figure 3:
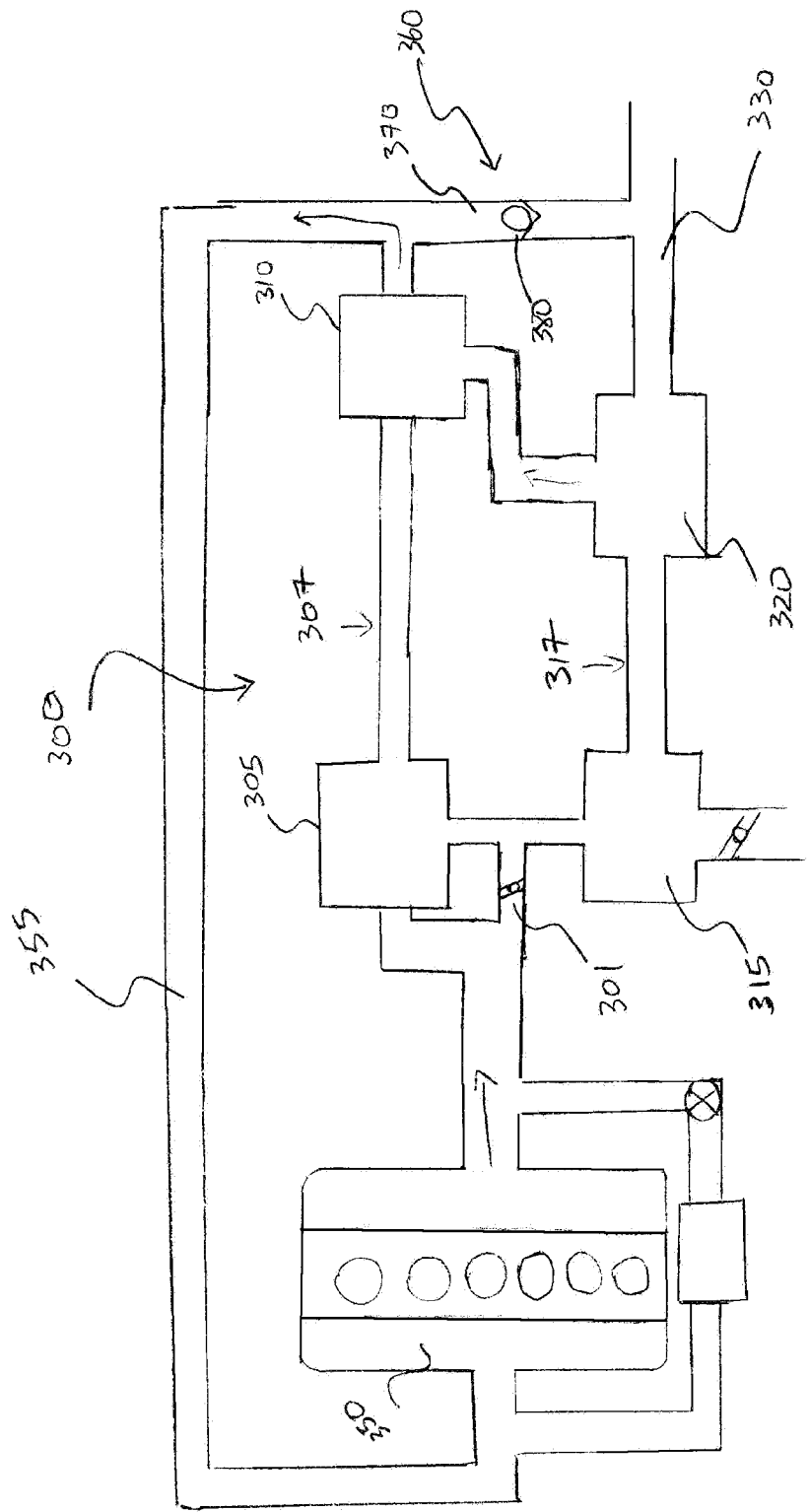
FIG. 3 is a schematic diagram of an engine system that includes a turbocharger bypass system in accordance with an exemplary embodiment of the invention.

In certain engine systems, it is desirable to have a dual turbocharger engine system to operate the vehicle under various loading conditions. In an engine system comprising a dual turbocharger engine system as illustrated in FIG. 3, exhaust gas enters a high pressure, two stage turbocharger 300 comprising a high pressure turbine 305 and a high pressure compressor 310. A wastegate or bypass valve 301, in an open position, diverts a portion of the exhaust gas directly to the low pressure turbine 315 which drives a low pressure compressor 320 without requiring all the exhaust gas to enter the high pressure turbine 305 before it reaches the low pressure turbine 315. Air enters the engine system via the air inlet 330 connected to the low pressure compressor 320. Compressed air exits the low pressure compressor 320 and enters the high pressure compressor 310 as its source of air supply. The air is further compressed in the high pressure compressor 310 before it flows toward the intake manifold 350 via the inlet air passage 355. The high pressure and low pressure turbines 305, 315 are connected respectively to the high pressure and low pressure compressors 310, 320 via a bearing housing 307, 317, disposed between the turbines 305, 315 and compressors 310, 320.

FIG. 3 illustrates a dual turbocharger engine system that includes a turbocharger bypass system 360 in accordance with an exemplary embodiment of the invention. The bypass system 360 is similarly adaptable for use with a single turbocharger engine system. A bypass system 360 provides an alternate passageway for atmospheric air to reach the intake manifold 350, via the inlet air passage 355 without entering the compressor. The bypass system 360 comprises air flow passageway 370 and a pressure dependent check valve 380.

The air flow passageway 370 connects the air inlet 330 of the low pressure compressor 320 to the inlet air passageway 355 to provide a direct path to the inlet air passage way 355 without the need for the air to flow through both the high pressure and low pressure compressors 310, 320 to reach the inlet air passage 355. Providing an alternative flow path for the air without requiring the air to enter the compressor 310, 320, under some operating conditions, also provides an increase in air flow to the intake, as the air flow can enter the inlet air passage 355 without encountering the resistance involved in navigating through multiple compressors 310, 320. This increase in air flow can also boost the engine braking performance under some operating conditions.

The bypass system 360 comprises a pressure dependent check valve 380. The pressure dependent check valve 380 opens when the pressure in the inlet air passage 355 decreases and generates a pressure differential across the valve, opening the valve and allowing air at atmospheric pressure to pass through the valve to reach the inlet air passage 355. By allowing atmospheric air to enter the inlet air passage 355, the pressure differential between the bearing housing 307, 317 and the outlet end of the compressors 310, 320 is decreased, and oil leakage is minimized. Due to its proximity to the inlet air passage 355, the high pressure compressor 310 is more prone to oil seepage from the bearing housing 307 than the low pressure compressor 320 when a vacuum is generated in the inlet air passage 355.

When the pressure in the inlet air passage 355 is greater than atmospheric pressure, the pressure dependent check valve 380 remains closed. Alternatively, a pressure dependent check valve which opens when the pressure differential across the valve, generated as a result of lower pressure on the inlet air passage side of the valve, reaches a predetermined level, can be used. When the check valve is open, the engine operates as a naturally aspirating engine. Various types of check valves known to one skilled in the art, including spring loaded ball check valves, can be used.

PARTS LIST 100 engine
101 block
103 intake system
105 exhaust system
105a first exhaust pipe
105b second exhaust pipe
107 turbocharger
109 turbine
111 compressor
115 inlet air passage
117 air inlet
119 optional charge air cooler
120 optional inlet throttle
121 inlet air mixer
122 intake manifold
124 EGR conduit
125 EGR valve
126 cooler
127 further conduit
129 exhaust manifold
132 turbine inlet
134 tailpipe
207 discharge nozzle
222 turbine housing
224 compressor housing
226 bearing housing
230 turbine wheel
232 shaft
236 compressor wheel
240 central bore
244, 246 bearing lands
250, 252 bearings
254 lubricant inlet port
256, 258 oil collection spaces
260 oil collection sump
300 high pressure turbocharger
301 bypass valve
305 high pressure turbine
307, 317 bearing housing
310 high pressure compressor
315 low pressure turbine
320 low pressure compressor
330 air inlet
350 intake manifold
355 inlet air passage
360 turbocharger bypass system
370 air flow passageway
380 pressure dependent check valve From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A turbocharger bypass system for reducing oil leakage in a turbocharger compressor housing, comprising:
   an air flow passageway between substantially atmospheric pressure air and the compressor housing; and
   a pressure dependent check valve disposed within the air flow passageway wherein the pressure dependent check valve opens when a pressure differential across the check valve reaches a predetermined level at which oil would leak into the compressor housing in the absence of opening of the check valve at said predetermined level.

2. The system of claim 1, wherein the air flow passageway is flow connected to an engine inlet air passage downstream of the turbocharger compressor.

3. The system of claim 2, wherein the air flow passageway is flow connected to an air inlet to the turbocharger compressor.

4. The system of claim 3, wherein the pressure dependent check valve opens when the pressure in the engine inlet air passage is less than the pressure in the air inlet to the turbocharger compressor.

5. The system of claim 3, wherein the pressure dependent check valve opens when a pressure differential across the check valve reaches a predetermined level.

6. The system of claim 5, wherein the predetermined level is a depression between 1 and 5 inches of $H_2O$ pressure.

7. The system of claim 2, wherein the pressure dependent check valve opens when the pressure in the engine inlet air passage is less than atmospheric pressure.

8. The system of claim 1, wherein the predetermined level is a depression between 1 and 5 inches of $H_2O$ pressure.

9. The system of claim 1, wherein the pressure dependent check valve is a spring loaded ball check valve.

10. The system of claim 1, wherein the pressure dependent check valve opens when a pressure in an engine inlet air passage is less than a pressure in a bearing housing connected to a compressor, wherein the engine inlet air passage is downstream of the compressor.

11. A method for reducing oil leakage into a turbocharger compressor housing, comprising the steps of:
    providing a flow of compressed air into the engine inlet air passageway when the pressure in the engine inlet air passage is equal to or greater than a predetermined level at which oil would leak from the turbocharger housing; and
    providing a flow of air directly into an engine inlet air passage when the pressure in the engine inlet air passage is less than said atmospheric pressure.

12. The method of claim 11, wherein in step a the pressure in the engine inlet air passage must be less than atmospheric pressure by a predetermined level.

13. The method of claim 12, wherein the predetermined level is between 1 to 5 inches of $H_2O$ pressure.

* * * * *